(12) United States Patent
Hashimoto (10) Patent No.: US 9,243,540 B2
(45) Date of Patent: Jan. 26, 2016

(54) CATALYTIC CONVERTER

(75) Inventor: Keita Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 117 days.

(21) Appl. No.: 14/008,674

(22) PCT Filed: Mar. 12, 2012

(86) PCT No.: PCT/JP2012/056332
§ 371 (c)(1),
(2), (4) Date: Sep. 30, 2013

(87) PCT Pub. No.: WO2012/137577
PCT Pub. Date: Oct. 11, 2012

(65) Prior Publication Data
US 2014/0037511 A1    Feb. 6, 2014

(30) Foreign Application Priority Data
Apr. 8, 2011    (JP) ................ 2011-086239

(51) Int. Cl.
| | |
|---|---|
| *B01D 50/00* | (2006.01) |
| *F01N 3/28* | (2006.01) |
| *B01D 53/94* | (2006.01) |
| *F01N 3/20* | (2006.01) |
| *B01J 35/04* | (2006.01) |
| *B01J 35/00* | (2006.01) |
| *B01J 23/40* | (2006.01) |
| *B01J 27/224* | (2006.01) |

(52) U.S. Cl.
CPC .......... *F01N 3/2889* (2013.01); *B01D 53/9495* (2013.01); *B01J 35/0033* (2013.01); *B01J 35/04* (2013.01); *F01N 3/2026* (2013.01); *B01J 23/40* (2013.01); *B01J 27/224* (2013.01); *Y02T 10/26* (2013.01)

(58) Field of Classification Search
CPC ...... F01N 3/2026; Y02T 10/26; B01J 27/224; B01D 53/9495
USPC ................................................. 422/174, 180
See application file for complete search history.

(56) References Cited

U.S. PATENT DOCUMENTS 5,245,825 A    9/1993    Ohhashi et al.
(Continued)

FOREIGN PATENT DOCUMENTS

| DE | 19602287 A1 | 8/1996 |
| JP | A-04-280086 | 10/1992 |

(Continued)

*Primary Examiner* — Tom P Duong
(74) *Attorney, Agent, or Firm* — Oliff PLC (57) ABSTRACT

A catalytic converter has a catalyst support that is heated due to supply of electricity, and a pair of electrodes that are disposed so as to contact an outer periphery of the catalyst support as seen in an orthogonal cross-section that is orthogonal to a direction in which exhaust flows. By making a volume resistivity of the electrodes be higher than that of electricity supplying portions of external cables that are connected to the electrodes respectively and are for supplying current to the electrodes, heat generated at the electrodes is provided to the catalyst support, and a generated heat amount of the catalyst support in vicinities of the electrodes is made to be large as compared with a generated heat amount at an inner portion of the catalyst support.

3 Claims, 6 Drawing Sheets

(56) References Cited

U.S. PATENT DOCUMENTS

| | | |
|---|---|---|
| 5,839,276 A | 11/1998 | Nishizawa |
| 6,060,699 A | 5/2000 | Sakurai et al. |
| 2013/0043237 A1 | 2/2013 | Sakashita et al. |
| 2013/0045137 A1* | 2/2013 | Sakashita et al. ............. 422/174 |

FOREIGN PATENT DOCUMENTS

| | | |
|---|---|---|
| JP | A-05-115796 | 5/1993 |
| JP | A-09-032533 | 2/1997 |
| JP | A-09-303137 | 11/1997 |
| WO | WO 2011/125817 A1 | 10/2011 |

* cited by examiner

FIG.2C
TEMPERATURE

FIG.2B
DISSIPATED HEAT AMOUNT

FIG.2A
GENERATED HEAT AMOUNT

FIG.4

FIG.5A
GENERATED HEAT AMOUNT

[MEDIUM | MEDIUM | MEDIUM]

114, 118A, 118B, 130, 116A, 116B, 112

FIG.5B
DISSIPATED HEAT AMOUNT

[LARGE | SMALL | LARGE]

114, 118A, 118B, 130, 116A, 116B, 112

FIG.5C
TEMPERATURE

[SMALL | LARGE | SMALL]

114, 118A, 118B, 130, 116A, 116B, 112

CATALYTIC CONVERTER

TECHNICAL FIELD

The present invention relates to a catalytic converter that is provided at the exhaust pipe of an internal combustion engine.

BACKGROUND ART

In a catalytic converter that is provided at an exhaust pipe in order to purify the exhaust generated at an internal combustion engine, it is desirable to supply electricity to a catalyst support, that is formed of metal and supports a catalyst, and raise the temperature of the catalyst support so as to obtain a sufficient catalytic effect. For example, Patent Document 1 (Japanese Patent Application Laid-Open No. 04-280086) discloses a honeycomb monolithic heater that has square cells (through-holes) whose cross-sectional shapes are square, and that obtains a uniform heat generating ability due to a pair of electrode plates being disposed such that the angles that are formed with the walls of these through-holes are acute angles.
[Patent Document 1] Japanese Patent Application Laid-Open No. 04-280086

DISCLOSURE OF INVENTION

Technical Problem

However, even if the distribution of current to the inner portion of the catalyst support is made to be substantially uniform and uniform generation of electricity is carried out, in vicinities of the electrode plates that contact the catalyst support (i.e., directly beneath the electrode plates), there is discharge of electricity from the electrode plates and transfer of heat to cables that are connected to the electrode plates, and therefore, it is easy for the temperature of the catalyst support in vicinities of the electrode plates to fall as compared with at the central portion of the catalyst support between the electrode plates.

In consideration of the above-described circumstances, an object of the present invention is to provide a catalytic converter that reduces non-uniformity of temperature of a catalyst support and that can approach a uniform temperature distribution.

Solution to Problem

A catalytic converter of a first aspect of the present invention comprises: a catalyst support that supports a catalyst for purifying exhaust discharged from an internal combustion engine, and that is heated due to electricity being supplied thereto; and a pair of electrodes that are disposed so as to contact an outer periphery of the catalyst support at opposing positions with the catalyst support therebetween, as seen in an orthogonal cross-section that is orthogonal to a direction in which the exhaust flows; and external cables that are connected to the electrodes respectively and supply current to the electrodes, and that are connected to positions at which a distance between the pair of electrodes is long as seen in the orthogonal cross-section, wherein, by making a volume resistivity of the electrodes higher than that of electricity supplying portions of external cables that are connected to the electrodes respectively and are for supplying current to the electrodes, heat generated at the electrodes is provided to the catalyst support, and a generated heat amount of the catalyst support in vicinities of the electrodes is made to be large as compared with a generated heat amount of an inner portion of the catalyst support, and the pair of electrodes are structured such that the volume resistivity becomes higher, gradually or in a stepped manner, from the positions where the external cables are connected, toward directions in which the distance between the pair of electrodes becomes shorter, as seen in the orthogonal cross-section.

In accordance with the catalytic converter of the first aspect of the present invention, the pair of electrodes are disposed so as to contact the outer periphery of the catalyst support, so as to oppose one another with the catalyst support therebetween. When electricity is supplied to the catalyst support from the external cables that are connected to the pair of electrodes respectively, the catalyst support is heated and the temperature thereof is raised, and therefore, the purifying effect of the exhaust by the supported catalyst is exhibited. At this time, by making the volume resistivity of the electrodes be higher than that of the electricity supplying portions of the external cables, the heat generated at the electrodes is provided to the catalyst support, and the generated heat amount of the catalyst support in vicinities of the electrodes is made to be large as compared with the generated heat amount of the inner portion of the catalyst support. Namely, in the vicinities of the electrodes of the catalyst support, as compared with the inner portion of the catalyst support, the dissipated heat amount is large due to heat dissipation from the electrodes and heat transfer to the external cables. However, by making the volume resistivity of the electrodes high, the generated heat amount of the catalyst support in vicinities of the electrodes is increased due to the heat generated at the electrodes, as compared with the generated heat amount at the inner portion of the catalyst support, and is made to be a generated heat amount that anticipates the dissipated heat amount of the catalyst support (is made to be a generated heat amount that is as if it compensates for the dissipated heat amount). Due thereto, heat generation at the respective regions of the catalyst support is uniformized, non-uniformity of the temperature of the catalyst support is reduced, and the catalyst support can be made to approach a uniform temperature distribution. Moreover, in accordance with this catalytic converter, as seen in the orthogonal cross-section, there is a structure in which the external cables are connected to positions where the distance between the pair of electrodes is long, and the volume resistivity of the pair of electrodes becomes higher, gradually or in a stepped manner, from the positions where the external cables are connected, toward the directions in which the distance between the pair of electrodes becomes shorter. Due thereto, the flowing of current becomes difficult in accordance with progression from the positions where the external cables are connected, toward the directions in which the distance between the pair of electrodes becomes shorter. Generally, the volume resistivity of the catalyst support is higher than the volume resistivity of the electrodes, and therefore, current attempts to flow more at the regions of the catalyst support where the distance between the pair of electrodes is short, than at the region of the catalyst support where the distance between the pair of electrodes is long. However, due to the structure in which the volume resistivity of the pair of electrodes becomes higher, gradually or in a stepped manner, toward the directions in which the distance between the pair of electrodes becomes shorter, the ease of flowing of the current at the region of the catalyst support where the distance between the pair of electrodes is long, and at the regions of the catalyst support where the distance between the pair of electrodes is short, is made uniform. Due thereto, current can be made to flow more uniformly at the catalyst support, non-uniformity of the temperature of the catalyst support is reduced more effectively, and the catalyst support can be made to approach a uniform temperature distribution.

Advantageous Effects of Invention

In accordance with the catalytic converter relating to the present invention, non-uniformity of temperature of a catalyst support is reduced and a uniform temperature distribution can be approached.

BEST MODES FOR CARRYING OUT THE INVENTION

A first embodiment of a catalytic converter relating to the present invention is described hereinafter by using FIG. 1A through FIG. 4.

Figure 1A:
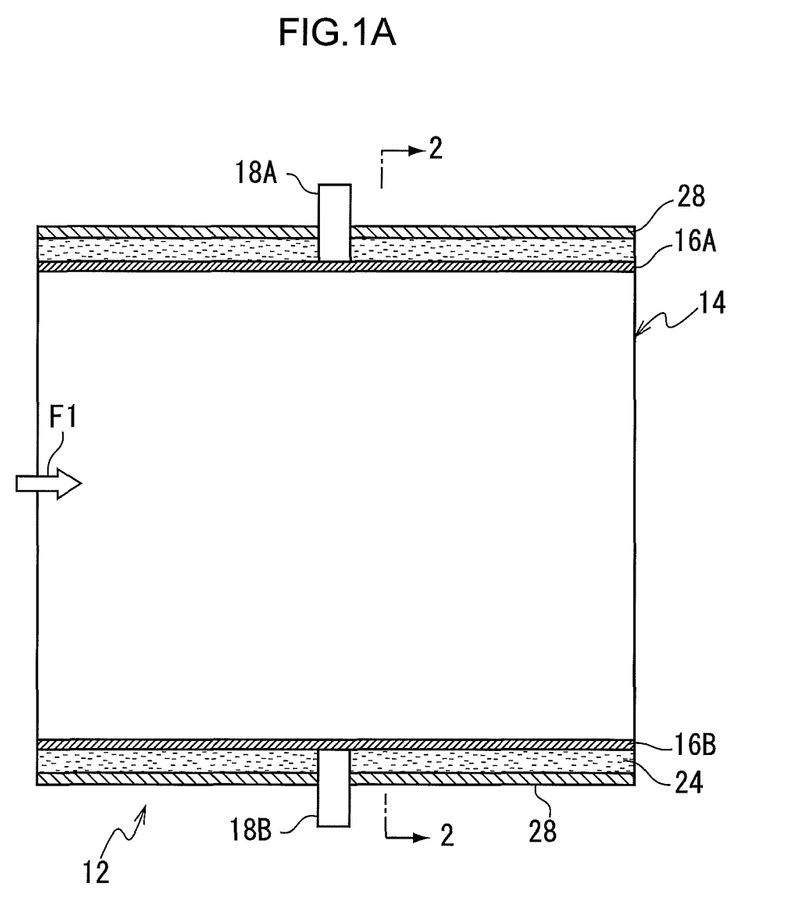
FIG. 1A is a drawing showing a catalytic converter of a first embodiment of the present invention, and is a cross-sectional view along a direction in which exhaust flows.
Figure 1B:
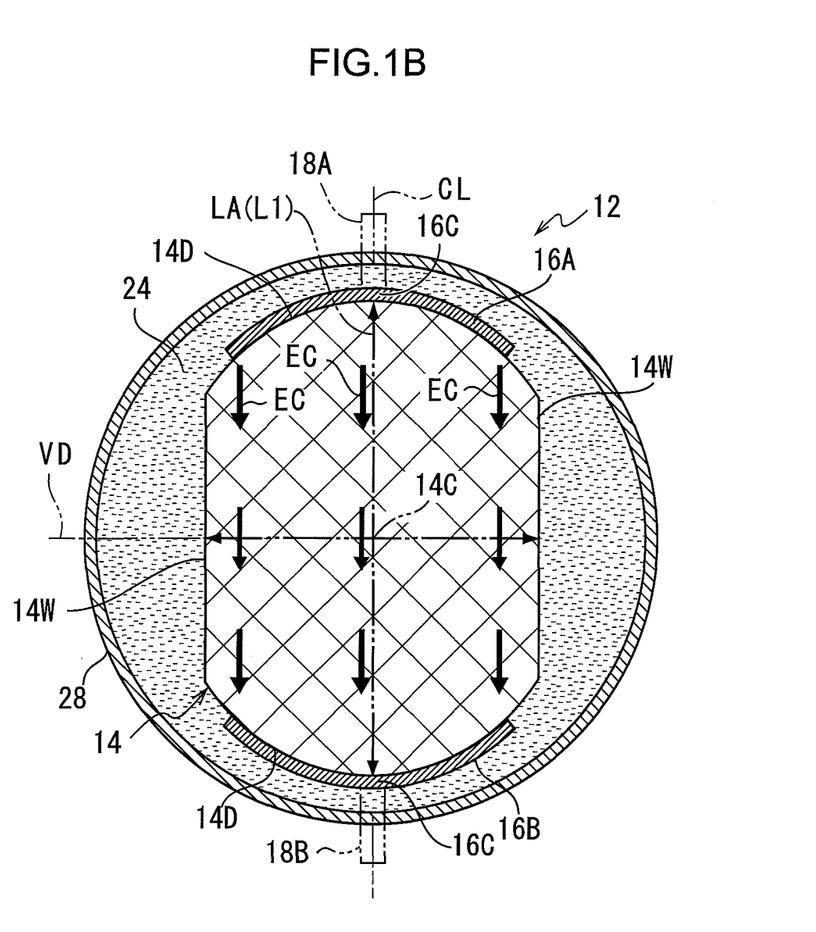
FIG. 1B is a drawing showing the catalytic converter of the first embodiment of the present invention, and is a cross-sectional view in a direction orthogonal to the direction in which exhaust flows.

A catalytic converter 12 relating to the present embodiment is shown in FIG. 1A. The catalytic converter 12 is installed along an exhaust pipe. Exhaust from an engine flows within the exhaust pipe. FIG. 1B illustrates the catalytic converter 12 in a cross-section in the direction orthogonal to the direction in which this exhaust flows (a cross-section along line 2-2 of FIG. 1A).

As shown in FIG. 1A and FIG. 1B, the catalytic converter 12 has a catalyst support 14 that is formed of a material that is electrically conductive and rigid. The surface area of the material of the catalyst support 14 is enlarged by forming the catalyst support 14 in, for example, a honeycomb shape. A catalyst (platinum, palladium, rhodium, or the like) is supported in a state of adhering to the surfaces of the catalyst support 14. The catalyst has the effect of purifying harmful substances within the exhaust that flows within the exhaust pipe (the flowing direction is shown by F1). Note that the structure for increasing the surface area of the catalyst support 14 is not limited to the aforementioned honeycomb shape, and may be wave-shaped or the like for example.

An electrically conductive ceramic, an electrically conductive resin, a metal or the like can be used as the material that structures the catalyst support 14, but, in the present embodiment, in particular, an electrically conductive ceramic is used. If the material that structures the catalyst support 14 is made to contain at least silicon carbide for example, it is preferable because high strength and heat resistance are obtained. Moreover, if the electrical resistivity is made to be 10 to 200 $\Omega$·cm, it is preferable because the temperature of the catalyst that is supported can be raised efficiently at the time of supplying electricity as will be described later. Making the porosity of the catalyst support be in the range of 30 to 60% is preferable. If the porosity is made to be greater than or equal to 30%, the needed surface area is ensured, and a large amount of the catalyst can be supported. Further, by making the porosity be less than or equal to 60%, the strength required of the catalyst support 14 can be maintained.

Two electrodes 16A, 16B are affixed to the catalyst support 14, and moreover, terminals 18A, 18A are connected to the centers of the electrodes 16A, 16B respectively. External cables 30 for supplying current are connected to the terminals 18A, 18B respectively (refer to FIG. 2A). The electrodes 16A, 16B are disposed so as to contact the catalyst support 14 at a range having a predetermined expanse along the outer peripheral surface of the catalyst support 14. The catalyst support 14 can be heated due to electricity being supplied to the catalyst support 14 from the terminals 18A, 18B through the electrodes 16A, 16B. Further, by raising the temperature of the catalyst, that is supported by the catalyst support 14, due to this heating, the exhaust purifying effect that the catalyst has can be exhibited better.

In the present embodiment, as can be understood from FIG. 1B, as seen in a cross-section orthogonal to the direction in which the exhaust flows (orthogonal cross-section), the catalyst support 14 is a so-called track shape in which the both sides in a transverse direction, that is orthogonal to a long axis LA of the oval shape, are formed to be rectilinear and substantially parallel to the long axis LA. Further, the pair of electrodes 16A, 16B are disposed at opposing positions with the catalyst support 14 therebetween, such that respective central portions (electrode centers 16C) of the electrodes 16A, 16B are positioned on the long axis LA the catalyst support 14.

Here, a central line CL is set as a line segment that connects the electrode centers 16C of the electrodes 16A, 16B, and a width W is defined as the length of the catalyst support 14 measured in the direction orthogonal to this central line CL. At this time, the central line CL coincides with the long axis LA of the catalyst support 14.

The catalyst support 14 is a shape that has left-right symmetry in FIG. 1B across the central line CL (the long axis LA). Moreover, the catalyst support 14 is a shape that similarly has top-bottom symmetry in FIG. 1B across a perpendicular bisector VD of the central line CL. At the catalyst support 14, gradually decreasing width portions 14D, whose width W in the direction orthogonal to the central line CL gradually decreases toward the electrode center 16C, are formed at the regions where the electrodes 16A, 16B are contactingly disposed. In the present embodiment, the portions where the electrodes 16A, 16B are affixed are curved surface portions that curve convexly toward the electrode 16A or the electrode 16B. Further, at the region where the electrodes 16A, 16B are not disposed contactingly, wide width portions 14W, whose outer edges are wider than the regions where the electrodes 16A, 16B are contactingly disposed (the gradually decreasing width portions 14D), are formed at the catalyst support 14. The wide width portions 14W are formed in rectilinear shapes substantially parallel to the central line CL. The wide width portions 14W are a maximum width portion where the width W of the catalyst support 14 is a maximum. At any arbitrary position, the width W of the catalyst support 14 is shorter than a length L1 of the central line CL (the long axis LA).

In the present embodiment, the wide width portions 14W of the catalyst support 14 are formed in rectilinear shapes substantially parallel to the central line CL. As compared with the vicinities of the electrodes 16A, 16B, the amount of reduction in the sectional surface area of the flow of current at the wide width portions 14W is small, and the decrease in the current density is small. Therefore, uniformizing of the amount of heat generated at the catalyst support 14 can be devised.

Further, by making the volume resistivity of the electrodes 16A, 16B higher than that of the electricity supplying portions (the electrical wires) of the external cables 30, there is a structure in which the heat generated at the electrodes 16A, 16B is provided to the catalyst support 14, and the generated heat amount of the catalyst support 14 in the vicinities of the electrodes 16A, 16B is made to be large as compared with the generated heat amount of the inner portion of the catalyst support 14 (e.g., a vicinity of a center 14C of the catalyst support 14 between the electrodes 16A, 16B). Here, volume resistivity means the electrical resistance value (Ω·cm) per unit volume. The resistance value of the material overall is determined by multiplying the length (L) by the volume resistivity and dividing by the sectional surface area (A). Volume resistivity is a value (a physical property value) that is unique to a substance, and, when comparing by using the same dimensions, a substance whose volume resistivity is large also has a large resistance value. In the present embodiment, the volume resistivity is increased by, for example, adjusting the material of the electrodes 16A, 16B, or the amount of additives that are added to the material.

In order to make the temperature distribution of the catalyst support 14 at the time that electricity is supplied be substantially uniform, the balance between the generated heat amount and the dissipated heat amount must be made to be substantially the same in the vicinities of the electrodes 16A, 16B (directly beneath the electrodes 16A, 16B in the drawings) and at the inner portion of the catalyst support 14 (e.g., a vicinity of the center 14C of the catalyst support 14 between the electrodes 16A, 16B).

In the present embodiment, a uniform temperature distribution is realized by controlling the generated heat amount of the catalyst support 14 in vicinities of the electrodes 16A, 16B.

Generated heat amount W due to the supply of electricity is expressed by $$W = R \times I^2$$

Here, W is the generated heat amount, I is the current, and R is the electrical resistance.

Further, the electrical resistance R is expressed by $$R = \rho \times L / A.$$

Here, $\rho$ is the volume resistivity of an electrical conductor (the electrodes 16A, 16B in the present embodiment), L is the length of the electrical conductor (the electrodes 16A, 16B), and A is the sectional surface area of the electrical conductor (the electrodes 16A, 16B). From the above formulas, it can be understood that, as a means for controlling the generated heat amount W, the volume resistivity $\rho$ of the electrodes 16A, 16B is a parameter.

Figure 2A:
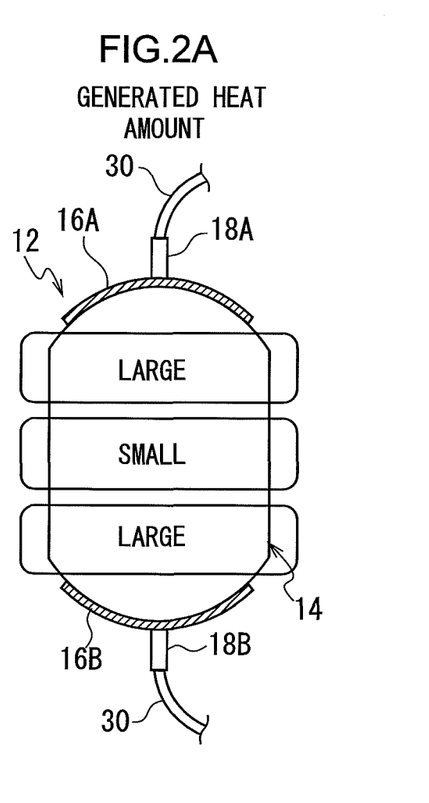
FIG. 2A is a drawing showing, in a cross-section orthogonal to the direction in which exhaust flows, a catalyst support and electrodes of the catalytic converter shown in FIG. 1B, and is a schematic drawing showing generated heat amounts of the catalyst support.
Figure 2B:
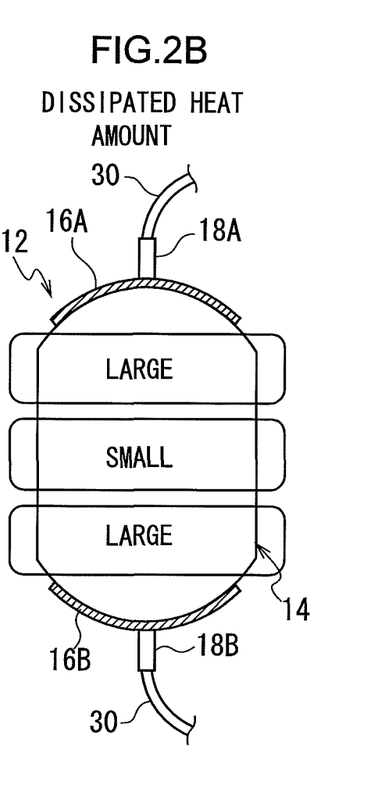
FIG. 2B is a drawing showing, in a cross-section orthogonal to the direction in which exhaust flows, the catalyst support and the electrodes of the catalytic converter shown in FIG. 1B, and is a schematic drawing showing dissipated heat amounts of the catalyst support.
Figure 2C:
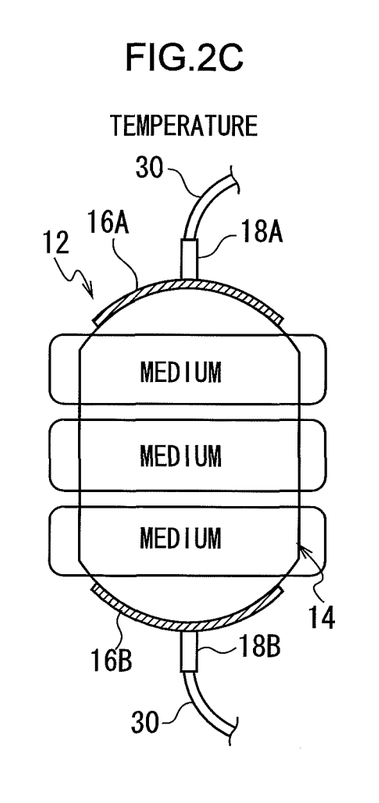
FIG. 2C is a drawing showing, in a cross-section orthogonal to the direction in which exhaust flows, the catalyst support and the electrodes of the catalytic converter shown in FIG. 1B, and is a schematic drawing showing a temperature distribution of the catalyst support.

The generated heat amounts in vicinities of the electrodes 16A, 16B of the catalyst support 14 and at the central portion of the catalyst support 14 are schematically shown in FIG. 2A. The dissipated heat amounts in vicinities of the electrodes 16A, 16B of the catalyst support 14 and at the central portion of the catalyst support 14 are schematically shown in FIG. 2B. Further, the temperatures in vicinities of the electrodes 16A, 16B of the catalyst support 14 and at the central portion of the catalyst support 14 are schematically shown in FIG. 2C.

As shown in FIG. 2B, in the vicinities of the electrodes 16A, 16B of the catalyst support 14, the dissipated heat amount is great due to heat dissipation from the electrodes 16A, 16B and heat transfer to the external cables 30. Therefore, as shown in FIG. 2A, the generated heat amount of the catalyst support 14 in vicinities of the electrodes 16A, 16B must be made to be larger than the generated heat amount of the central portion of the catalyst support 14. Therefore, in order to increase the generated heat amount of the catalyst support 14 in vicinities of the electrodes 16A, 16B, the volume resistivity of the electrodes 16A, 16B is made to be higher than that of the electricity supplying portions of the external cables 30. Namely, by making the volume resistivity of the electrodes 16A, 16B be higher than that of the electricity supplying portions of the external cables 30, the heat generated at the electrodes 16A, 16B is provided to the catalyst support 14, and the generated heat amount of the catalyst support 14 in vicinities of the electrodes 16A, 16B is made to be large as compared with the generated heat amount of the inner portion of the catalyst support 14 (e.g., a vicinity of the center 14C of the catalyst support 14 between the electrodes 16A, 16B).

A holding member 24, that is formed in the shape of a tube and of an insulating material, is disposed at the outer periphery of the catalyst support 14. Moreover, a case cylinder 28, that is molded in a cylindrical shape of a metal such as stainless steel or the like, is disposed at the outer periphery of the holding member 24. Namely, the catalyst support 14 is accommodated at the interior of the case cylinder 28 that is cylindrical tube shaped, and the catalyst support 14 is held at the interior of the case cylinder 28 without a gap by the holding member 24 that is disposed between the case cylinder 28 and the catalyst support 14. Further, because the holding member 24 that is insulating is disposed between the catalyst support 14 and the case cylinder 28, flow of current from the catalyst support 14 toward the case cylinder 28 is impeded.

Operation and effects of the catalytic converter 12 of the present embodiment are described next.

The case cylinder 28 of the catalytic converter 12 is mounted midway along an exhaust pipe, and exhaust passes through the interior of the catalyst support 14 in the arrow F1 direction. At this time, harmful substances within the exhaust are purified by the catalyst that is supported by the catalyst support 14. At the catalytic converter 12 of the present embodiment, current is supplied from the external cables 30, and electricity is supplied to the catalyst support 14 by the terminals 18A, 18B and the electrodes 16A, 16B, and the catalyst support 14 is heated. At the catalyst support 14, the current between the electrodes 16A, 16B flows like arrows EC. Due to the catalyst support 14 being heated, the temperature of the catalyst that is supported by the catalyst support 14 is raised, and the purifying action can be exhibited well. In cases in which the temperature of the exhaust is low, such as immediately after start-up of the engine or the like for example, by supplying electricity to and heating the catalyst support 14 in advance, the purifying performance of the catalyst in the initial stage of engine start-up can be ensured.

The catalytic converter 12 of the present embodiment is structured such that the volume resistivity of the pair of electrodes 16A, 16B, that oppose one another with the catalyst support 14 therebetween, is higher than that of the electricity supplying portions of the external cables 30.

Figure 5A:
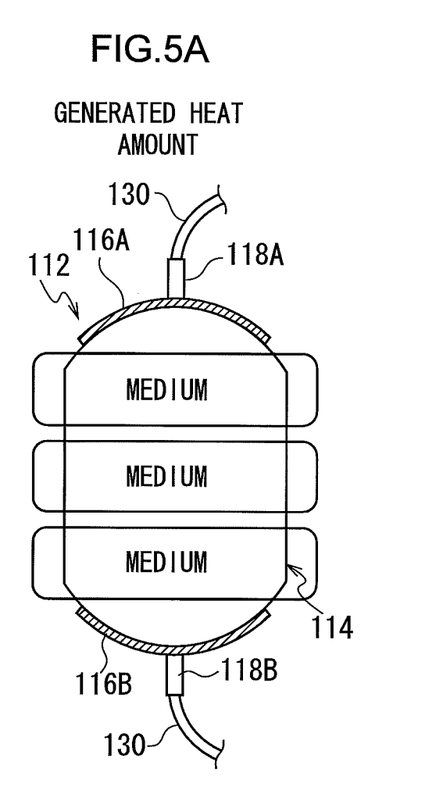
FIG. 5A is a drawing showing, in a cross-section orthogonal to the direction in which exhaust flows, a catalyst support and electrodes of a catalytic converter of a comparative example, and is a schematic drawing showing generated heat amounts of the catalyst support.
Figure 5B:
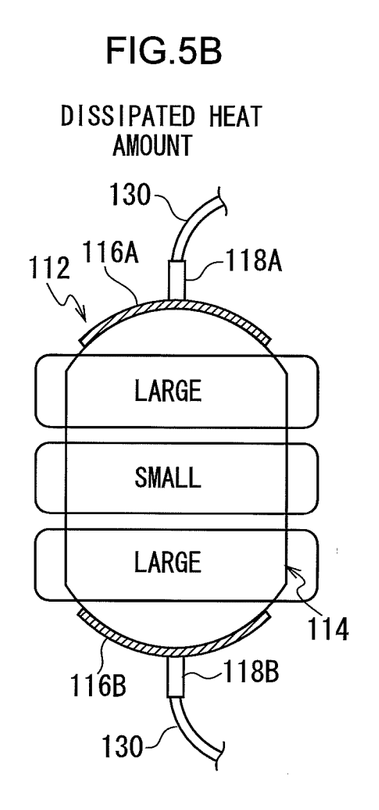
FIG. 5B is a drawing showing, in a cross-section orthogonal to the direction in which exhaust flows, the catalyst support and the electrodes of the catalytic converter of the comparative example, and is a schematic drawing showing dissipated heat amounts of the catalyst support.
Figure 5C:
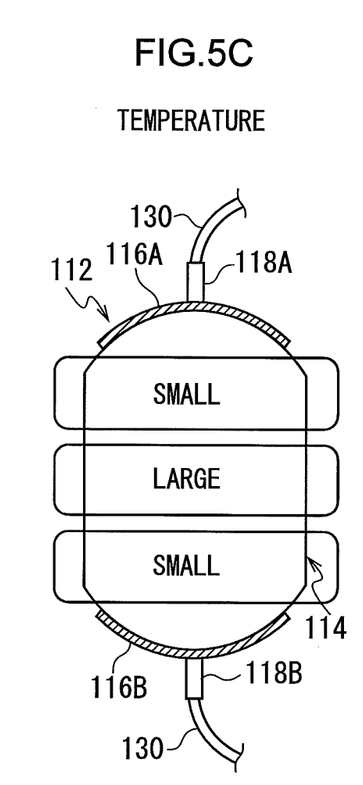
FIG. 5C is a drawing showing, in a cross-section orthogonal to the direction in which exhaust flows, the catalyst support and the electrodes of the catalytic converter of the comparative example, and is a schematic drawing showing a temperature distribution of the catalyst support.

Here, as shown in FIG. 5A through FIG. 5C, there is supposed a catalytic converter 112 of a comparative example that is structured such that the volume resistivity of a pair of electrodes 116A, 116B is not increased more than that of the electricity supplying portions of external cables 130. As shown in FIG. 5B, in vicinities of the electrodes 116A, 116B of a catalyst support 114, the dissipated heat amount is large due to heat dissipation from the electrodes 116A, 116B and the heat transfer to the external cables 130 (refer to FIG. 2B). Therefore, as shown in FIG. 5A, even if the current distribution of the inner portion of the catalyst support 114 is made to be substantially uniform and uniform heat generation is realized, as shown in FIG. 5C, the temperature in the vicinities of the electrodes 116A, 116B of the catalyst support 114 decreases more than the temperature of the central portion of the catalyst support 114, by an amount corresponding to the amount by which the heat dissipation amount is greater.

In contrast, at the catalytic converter 12 of the present embodiment, as shown in FIG. 2A, by making the volume resistivity of the electrodes 16A, 16B be higher than that of the electricity supplying portions of the external cables 30, the electrodes 16A, 16B are made to generate heat, and the generated heat thereof is provided to the catalyst support 14, and the generated heat amount in the vicinities of the electrodes 16A, 16B (directly beneath the electrodes 16A, 16B) of the catalyst support 14 is made to be large as compared with the generated heat amount of the central portion of the catalyst support 14. Namely, the generated heat amount in the vicinities of the electrodes 16A,16B of the catalyst support 14 is increased as compared with the generated heat amount of the central portion of the catalyst support 14 (the generated heat amount in the vicinities of the electrodes 16A, 16B of the catalyst support 14 is made to be a generated heat amount that anticipates the dissipated heat amount of the catalyst support 14), in order to compensate for the dissipated heat amount in the vicinities of the electrodes 16A, 16B of the catalyst support 14. Due thereto, heat generation at the respective regions of the catalyst support 14 can be uniformized. Therefore, as shown in FIG. 2C, non-uniformity of the temperature of the catalyst support 14 is reduced, and the catalyst support 14 can be made to approach a uniform temperature distribution.

A catalytic converter 52 of a second embodiment of the present invention is described next by using FIG. 3 and FIG. 4. Note that structural portions that are the same as in the above-described first embodiment are denoted by the same numerals, and description thereof is omitted.

Figure 3:
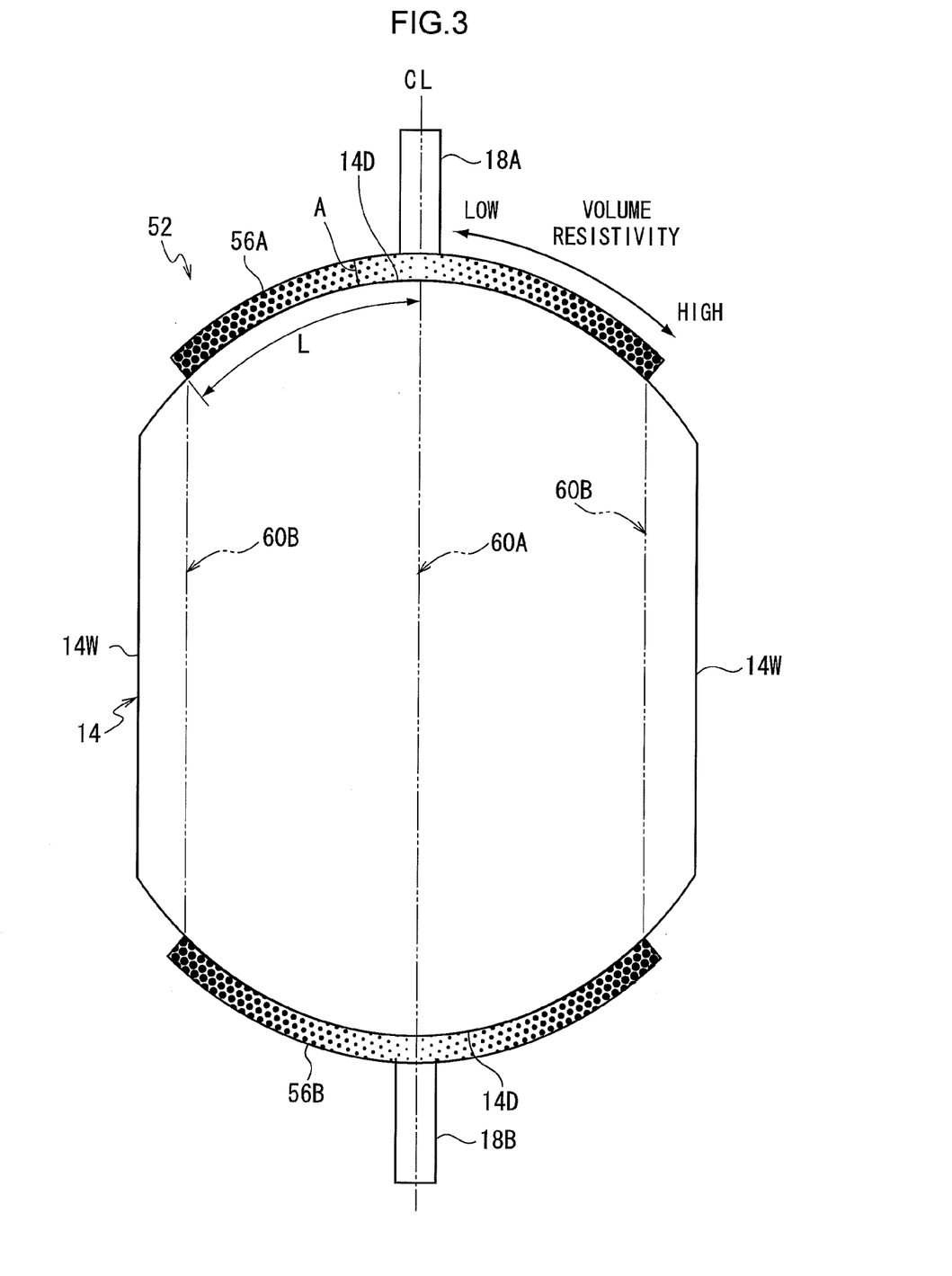
FIG. 3 is a cross-sectional view showing, in a cross-section orthogonal to the direction in which exhaust flows, a catalyst support and electrodes of a catalytic converter of a second embodiment of the present invention.

As shown in FIG. 3, as seen in a cross-section orthogonal to the direction in which the exhaust flows (orthogonal cross-section), two electrodes 56A, 56B are affixed, so as to oppose one another with the catalyst support 14 therebetween, to the gradually decreasing width portions 14D of the catalyst support 14, and further, the terminals 18A, 18B are connected respectively to the centers of the electrodes 56A, 56B. Namely, the external cables 30 (refer to FIG. 2A) are connected via the terminals 18A, 18B to positions at which the distance between the pair of electrodes 56A, 56B is long as seen in the orthogonal cross-section (positions of the central line CL in the present embodiment).

The pair of electrodes 56A, 56B are structured such that the volume resistivity becomes higher from, as seen in the orthogonal cross-section, the positions at which the terminals 18A, 18B are provided (the positions at which the external cables 30 are connected) toward the directions in which the distance between the pair of electrodes 56A, 56B becomes shorter. In other words, the pair of electrodes 56A, 56B are structured such that the volume resistivity becomes higher from a position 60A where the distance between the pair of electrodes 56A, 56B is long (the position of the central line CL), toward positions 60B where the distance between the pair of electrodes 56A, 56B becomes shorter (positions at the wide width portion 14W sides of the catalyst support 14).

The present embodiment is structured such that the volume resistivity becomes higher toward the directions in which the distance between the pair of electrodes 56A, 56B becomes shorter, by adjusting, for example, the material of the electrodes 56A, 56B or the amount of additives that are added to the material. The present embodiment may be structured such that the volume resistivity of the electrodes 56A, 56B becomes higher gradually from the positions at which the terminals18A, 18B are provided toward the directions in which the distance between the pair of electrodes 56A, 56B becomes shorter, or may be structured such that the volume resistivity becomes higher in a stepped manner.

By structuring the catalytic converter 52 such that the volume resistivity becomes higher from the position where the distance between the pair of electrodes 56A, 56B is long toward directions in which the distance between the pair of electrodes 56A, 56B becomes shorter, it becomes difficult for current to flow from the position where the distance between the pair of electrodes 56A, 56B is long (the position where the terminals 18A, 18B are provided) toward directions in which the distance between the pair of electrodes 56A, 56B becomes shorter.

Generally, because the volume resistivity of the catalyst support 14 is higher than the volume resistivity of the electrodes 56A, 56B, current attempts to flow at the regions of the catalyst support 14 where the distance between the pair of electrodes 56A, 56B is short (vicinities of the wide width portions 14W), rather than the region of the catalyst support 14 where the distance between the pair of electrodes 56a, 56B is long (a vicinity of the central line CL). In contrast, in the present embodiment, due to the structure in which the volume resistivity of the pair of electrodes 56A, 56B becomes higher from the position where the distance between the pair of electrodes 56A, 56B is long toward the directions in which the distance between the pair of electrodes 56A, 56B becomes shorter, as shown in FIG. 4, there is a structure in which the electrical resistance of the electrodes 56A, 56B and the catalyst support 14, at the position 60A where the distance between the pair of electrodes 56A, 56B is long, and the electrical resistance of the electrodes 56A, 56B and the catalyst support 14, at the positions 60B where the distance between the pair of electrodes 56A, 56B is short, become substantially the same.

Here, as shown in FIG. 3, given that the volume resistivity of the electrodes 56A, 56B is ρ, the length of the electrodes 56A, 56B is L, and the sectional surface area of the electrodes 56A, 56B is A, the electrical resistance R is expressed by $$R = \rho \times L/A.$$

Figure 4:
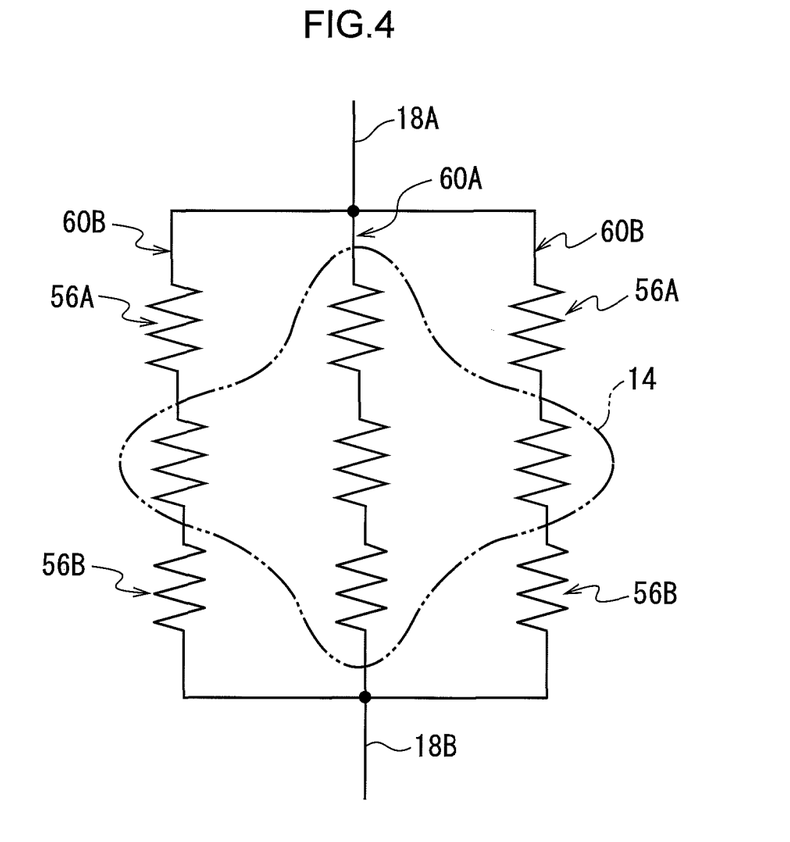
FIG. 4 is a schematic drawing showing the electrical resistances of the catalyst support and the electrodes of the catalytic converter shown in FIG. 3.

Further, the portion that is surrounded by the catalyst support 14 shown by the two-dot chain line in FIG. 4 shows the electrical resistance due to the catalyst support 14. As shown in FIG. 4, at the position 60A where the distance between the pair of electrodes 56A, 56B is long, the electrical resistance of the catalyst support 14 is large as compared with at the positions 60B where the distance between the pair of electrodes 56A, 56B is short. Further, the outer sides of the portion that is surrounded by the catalyst support 14 at the positions 60B where the distance between the pair of electrodes 56A, 56B is short in FIG. 4, show the electrical resistance due to the electrodes 56A, 56B. In the present embodiment, the volume resistivity of the electrodes 56A, 56B is adjusted such that the total electrical resistances become substantially the same at the position 60A, where the distance between the pair of electrodes 56A, 56B is long, and the positions 60B where the distance between the pair of electrodes 56A, 56B is short.

Due thereto, the ease of flowing of current at the regions of the electrodes 56A, 56B and the catalyst support 14 at the position 60A where the distance between the pair of electrodes 56A, 56B is long, and at the regions of the electrodes 56A, 56B and the catalyst support 14 at the positions 60B where the distance between the pair of electrodes 56A, 56B is short, is uniformized, and current can be made to flow more uniformly at the catalyst support 14. Therefore, non-uniformity of the temperature of the catalyst support 14 is reduced more effectively, and the catalyst support 14 can be made to approach a substantially uniform temperature distribution.

Note that, in the above-described embodiments, the catalyst support 14 has, at the regions where the pair of electrodes are contactingly disposed, the gradually decreasing width portions 14D, whose width W in the direction orthogonal to the central line CL gradually decreases toward the electrode center, and has, at the region where the pair of electrodes are not disposed contactingly, the wide width portions 14W that are rectilinear and are formed substantially parallel to the central line CL. However, the present invention is not limited to this structure, and the shape of the catalyst support can be changed. For example, the shape of the catalyst support can be changed so as to be oval, drum-shaped, circular or the like as seen in the cross-section orthogonal to the direction in which the exhaust flows.

The invention claimed is:

1. A catalytic converter comprising:
    a catalyst support that supports a catalyst for purifying exhaust discharged from an internal combustion engine, and that is heated due to electricity being supplied thereto; and
    a pair of electrodes that are disposed so as to contact an outer periphery of the catalyst support at opposing positions with the catalyst support therebetween, as seen in an orthogonal cross-section that is orthogonal to a direction in which the exhaust flows; and
    external cables that are connected to the electrodes respectively and supply current to the electrodes, and that are connected to positions at which a distance between the pair of electrodes is long as seen in the orthogonal cross-section, wherein, by making a volume resistivity of the electrodes higher than that of electricity supplying portions of external cables that are connected to the electrodes respectively and are for supplying current to the electrodes, heat generated at the electrodes is provided to the catalyst support, and a generated heat amount of the catalyst support in vicinities of the electrodes is made to be large as compared with a generated heat amount of an inner portion of the catalyst support, and
    the pair of electrodes are structured such that the volume resistivity becomes higher, gradually or in a stepped manner, from the positions where the external cables are connected, toward directions in which the distance between the pair of electrodes becomes shorter, as seen in the orthogonal cross-section.

2. The catalytic converter of claim 1, wherein a thickness of each of the pair of electrodes is uniform from the respective positions where the external cables are connected toward directions in which the distance between the pair of electrodes become shorter, as seen in the orthogonal cross-section.

3. A catalytic converter for use with an internal combustion engine, the catalytic converter comprising:
    a catalyst support configured to support a catalyst for purifying exhaust discharged from the internal combustion engine, the catalyst support being heated by electricity;
    a pair of electrodes disposed so as to contact an outer periphery of the catalyst support at opposing positions with the catalyst support disposed between the pair of electrodes, as seen in an orthogonal cross-section that is orthogonal to a direction in which the exhaust flows; and
    a plurality of external cables connected to the pair of electrodes respectively and configured to supply current to the pair of electrodes, the plurality of external cables being connected to respective positions at which a distance between the pair of electrodes is greatest as seen in the orthogonal cross-section, a volume resistivity of the pair of electrodes being higher than a volume resistivity of electricity supplying portions of the plurality of external cables that are respectively connected to the pair of electrodes, the electricity supplying portions of the plurality of external cables being configured to supply current to the pair of electrodes, and heat generated by the pair of electrodes is provided to the catalyst support such that a generated heat amount of the catalyst support in vicinities of the pair of electrodes is greater than a generated heat amount of an inner portion of the catalyst support, wherein
    the pair of electrodes are structured such that the volume resistivity increases, gradually or in a stepped manner, in a direction where each electrode of the pair of electrodes moves away from the respective positions where each of the external cables are connected, as seen in the orthogonal cross-section.

* * * * *